United States Patent
Hsiao

(10) Patent No.: US 7,548,009 B2
(45) Date of Patent: Jun. 16, 2009

(54) MINIATURE MOTOR

(75) Inventor: Bor-Yuan Hsiao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 193 days.

(21) Appl. No.: 11/610,662

(22) Filed: Dec. 14, 2006

(65) Prior Publication Data

US 2008/0061658 A1 Mar. 13, 2008

(51) Int. Cl.
*H02N 2/00* (2006.01)
(52) U.S. Cl. .................. 310/300; 310/307; 310/40 MM
(58) Field of Classification Search ................. 310/300, 310/307, 40 MM
See application file for complete search history.

(56) References Cited

U.S. PATENT DOCUMENTS

| | | | | |
|---|---|---|---|---|
| RE22,971 | E * | 2/1948 | Burgess | 310/300 |
| 2,851,618 | A * | 9/1958 | Krawinkel | 310/300 |
| 5,459,365 | A | 10/1995 | Yuhi | |
| 7,230,771 | B2 * | 6/2007 | Kuiper et al. | 359/665 |
| 7,268,310 | B2 * | 9/2007 | Beerling | 200/182 |
| 2006/0072070 | A1 * | 4/2006 | Kuiper et al. | 351/177 |
| 2007/0058094 | A1 * | 3/2007 | Kuiper et al. | 349/1 |
| 2007/0139751 | A1 * | 6/2007 | Kuiper et al. | 359/223 |
| 2007/0237937 | A1 * | 10/2007 | Aizenberg et al. | 428/221 |

OTHER PUBLICATIONS

Robert A. Hayes & B. J. Feenstra, Video-speed Electronic Paper Based on Electrowetting, nature, Sep. 25, 2003, vol. 425, pp. 383-385.

* cited by examiner

*Primary Examiner*—Thomas M Dougherty
(74) *Attorney, Agent, or Firm*—Frank R. Niranjan

(57) ABSTRACT

A miniature motor includes an actuator and a transmission assembly. The actuator includes a chamber, an electrically conductive aqueous layer, a dielectric oily layer and two electrodes. The aqueous and oily layers are accommodated in the chamber. The oily layer contacts with the aqueous layer thereby forming a contact interface therebetween. The two electrodes are configured for producing an electric field to induce the aqueous layer to produce an electrowetting effect. The transmission assembly includes a thin film disposed at the interface and at least one transmission member. The thin film defines a first surface and a second surface, respectively, facing towards the aqueous and oily layers. A hydrophilic coating and a hydrophobic coating are, respectively, formed on the first and second surfaces. Each transmission member has a first end connected to one of the hydrophilic and hydrophobic coatings and a second end extending out of the chamber.

17 Claims, 4 Drawing Sheets

MINIATURE MOTOR

TECHNICAL FIELD

The present invention relates to miniature motors and, more particularly, to a miniature motor having an axial driving transmission.

BACKGROUND

In recent years, miniature motors (i.e., micro-motors) have been extensively used in a wide field including a variety of equipments, such as for example, air conditioners of automobiles, CD (compact disc) players, copying machines, compact cameras, compact electric equipments, mobile phones, toys or the like. At present, a variety of miniature motors are designed and developed for application in increasing various field, particularly in miniaturization in weight and size with more performance.

A kind of typical miniature motor includes a rotor and exciting coils wound around a part of the stator. The miniature motor is driven to rotate by charging an exiting current to the exciting coils. In the case where the exciting coils are used, a considerable number of windings are required for the exciting coils. If the diameter of the wires for the coils is reduced to as small as 10 micrometers or less for the purpose of miniaturization of the motors, the exciting coils tend to be easily broken. This causes the exciting coils to be extremely difficult to be wind around the stator.

Accordingly, the exciting coils should be inevitably thick and large, and it is very difficult to miniaturize such motors, as a whole. On the one hand, such thick and large dimensions are undesirable and unsatisfactory for a demand of compact and lightweight in various portable devices, such as mobile phones and digital cameras.

On the other hand, the thicker and larger of the exciting coils, the more heat is generated therefrom. Accordingly, when being operated for a long period, the exciting coils could be prone to overheating. This would produce undue interference and influence on the miniature motor and other related components in some aspects, e.g., performance properties and lifetimes. For example, in a camera using the miniature motor, frequent photographic operation may overheat the optical components, thereby decreasing the imaging properties (e.g., refractive index and functional structure) of the optical components.

What is needed, therefore, is a miniature motor that is compact and lightweight and that has a relatively long operating lifetime.

SUMMARY

In accordance with a preferred embodiment, a miniature motor includes an actuator and a transmission assembly. The actuator includes a chamber, an electrically conductive aqueous layer, a dielectric oily layer, and a pair of electrodes. The aqueous layer and the oily layer are accommodated in the chamber. The oily layer contacts the aqueous layer, thereby forming a contact interface therebetween. The pair of electrodes is configured (i.e., structured and arranged) for producing an electric field to induce the aqueous layer to produce an electrowetting effect. The transmission assembly includes a thin film and at least one transmission member. The thin film is disposed at the contact interface. The thin film defines a first surface and a second surface opposite to the first surface. The first and second surfaces, respectively, face towards the aqueous and oily layers. A hydrophilic coating and a hydrophobic coating are, respectively, formed on the first and second surfaces. Each transmission member has a first end and a second end opposite to the first end. The first end is connected to one of the hydrophilic coating and the hydrophobic coating of the thin film. The second end extends out of the chamber.

Other advantages and novel features will be drawn from the following detailed description of preferred embodiments when conjunction with the attached drawings.

BRIEF DESCRIPTION OF THE DRAWINGS

Many aspects of the present miniature motor can be better understood with reference to the following drawings. The components in the drawings are not necessarily drawn to scale, the emphasis instead being placed upon clearly illustrating the principles of the present miniature motor. Moreover, in the drawings, like reference numerals designate corresponding parts throughout the several views.

DETAILED DESCRIPTION OF THE PREFERRED EMBODIMENT

Embodiments of the present miniature motor will now be described in detail below and with reference to the drawings.

Figure 1:
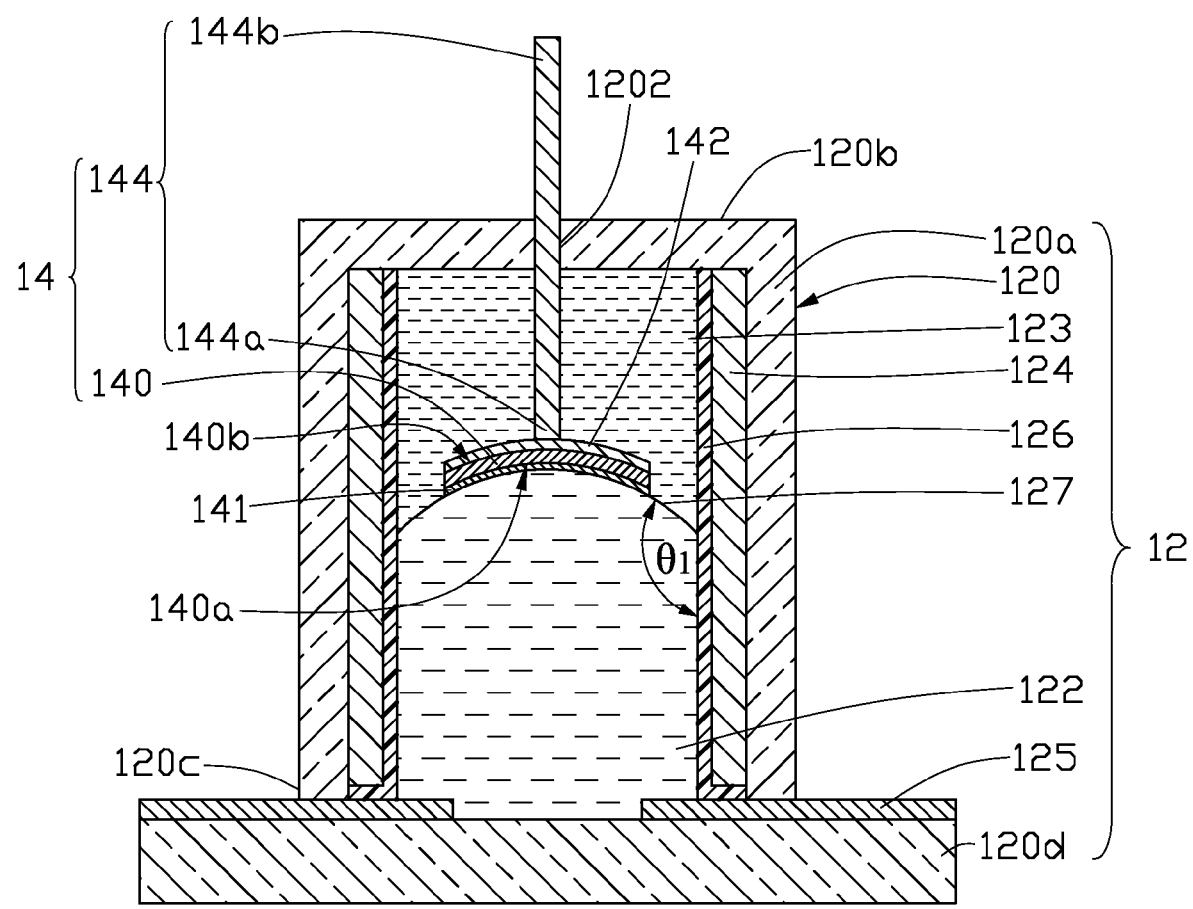
FIG. 1 is a schematic, cross-sectional view of a miniature motor, according to a first preferred embodiment.

FIG. 1 illustrates a miniature motor 10, in accordance with a first preferred embodiment. The miniature motor 10 includes an actuator 12 and a transmission assembly 14. The transmission assembly 14 is partially accommodated in the actuator 12 and partially extends out of the actuator 12.

The actuator 12 includes a chamber 120, an electrically conductive aqueous layer 122, an oily layer 123, a first electrode 124, a second electrode 125, and a dielectric hydrophobic layer 126. The aqueous layer 122 and the oily layer 123 are accommodated in the chamber 120 and contact each other. The first electrode 124 is disposed on a sidewall 120a of the chamber 120. The second electrode 125 is electrically connected to the aqueous layer 122. The hydrophobic layer 126 contacts the aqueous layer 122.

The chamber 120 is advantageously in a tubular shape to promote efficient fluid flow therein. For example, the chamber 120 can be a hollow tubular container, as shown in FIG. 1. In addition to the sidewall 120a, i.e., tubular wall, the tubular chamber 120 includes a closed end wall 120b adjoining the sidewall 120a, an opening end 120c opposite to the closed end wall 120a, and a substrate 120d. The substrate 120d is hermetically disposed at the opening end 120c. The end wall 120b defines a through orifice 1202 at the center thereof. The chamber 120 is beneficially made of, e.g., glass or ceramic. The chamber 120 usefully has an inner diameter of less than about 2 millimeters, thereby keeping the size of the overall device thereof relatively small and minimizing the amount of fluid to be contained and thus moved therein (i.e., more energy can be transferred to the movement of the actuator 12).

In the illustrated embodiment, the aqueous layer 122 is a lower layer disposed on the substrate 120d. The oily layer 123 is an upper layer and contacts with the aqueous layer 122. The oily layer 123 is typically not soluble or miscible in the aqueous layer 122. Accordingly, a contact interface 127 is formed between the aqueous layer 122 and the oily layer 123. Due to solid/fluid interfacial tension between the hydrophobic layer 126 and the aqueous/oily layers 122/123, the contact interface 127 is typically partially spherical in shape. The partial spherical contact interface 127 is curved inwardly toward the oily layer 123 (i.e., concave relative to the oily layer 123; convex relative to the aqueous layer 122). The contact interface between the aqueous layer 122 and the hydrophobic layer 126 defines a contact angle $\theta 1$. The contact angle $\theta 1$ is typically an obtuse angle.

The aqueous layer 122 is usefully a weak brine layer. The brine could be, e.g., a sodium chloride solution, potassium chloride solution, sodium sulfate solution, or calcium chloride solution. The oily layer 123 could be, advantageously, a silicone grease or an aliphatic alkane (typically C10-C16). Preferably, the aqueous material of the aqueous layer 122 has a density equal or similar to that of the oily material of the oily layer 123, in order to prevent gravity (i.e., a weight differential between the materials) from influencing the contact interface 127.

The first electrode 124 is, advantageously, annularly disposed on an inner surface of the sidewall 120a. The first electrode 124 could, beneficially, be an electrically conductive coating deposited on the inner surface of the sidewall 120a, for example, by a chemical vapor deposition method or a sputtering method.

The hydrophobic layer 126 is, advantageously, annularly formed on the first electrode 124. The hydrophobic layer 126 could, beneficially, be coated on the first electrode 124, for example, by a chemical vapor deposition method or a sputtering method. The hydrophobic layer 126 electrically isolates the first electrode 124 from the aqueous layer 122 and the oily layer 123. Alternatively, the hydrophobic layer 126 could electrically isolate the first electrode 124 only from the aqueous layer 122, when the oily layer 123 is made of a dielectric material, e.g., silicone greases or aliphatic alkanes. The hydrophobic layer 126 usefully surrounds the aqueous layer 122 and the oily layer 123. The hydrophobic layer 126 is, advantageously, made of a hydrophobic material, e.g., polycarbonate, tetrafluoroethylene, polyparaxylene, polyethene, olefin, and/or polysiloxane.

The second electrode 125 is disposed on the substrate 120d. The second electrode 125 is advantageously in a ring form. The second electrode 125 could, beneficially, be an electrically conductive coating deposited on the inner surface of the sidewall 120a, for example, by a chemical vapor deposition method or a sputtering method. A portion of the ring-shaped second electrode 125 is inserted into the chamber 120 and is electrically connected to the aqueous layer 122 and the oily layer 123. Portion of the ring-shaped second electrode 125 extends out of the chamber 120 to be electrically connected to a power supply. The second electrode 125 is electrically isolated from the first electrode 124, e.g., by the dielectric hydrophobic layer 126.

The transmission assembly 14 includes a thin film 140 and a transmission member 144. The thin film 140 is disposed at the contact interface 127. The thin film 140 could, advantageously, be coaxial with the contact interface 127. The transmission member 144 is connected to the thin film 140. The transmission member 144 extends out of the chamber 120 through the orifice 1202. The transmission member 144 can, advantageously, readily slide across/through the orifice 1202. The transmission member 144 and the orifice 1202 are cooperatively watertight therebetween. For example, a portion of the transmission member 144 contacting with the orifice 1202 is coated with a lubricant layer, for example, lubricating oil, paraffin wax, or petroleum jelly.

The thin film 140 defines a first surface 140a and a second surface 140b, opposite to the first surface 140a. The first and second surfaces 140a, 140b face towards the aqueous and oily layers 122, 123, respectively. Hydrophilic and hydrophobic coatings 141, 142 are formed on the first and second surfaces 140a, 140b, respectively. Due to the simulated dissoluble theory, the two coatings 141 and 142 tightly contact or touch with the aqueous and oily layers 122, 123, respectively. This sort of contact is beneficial in that the thin film 140 is able to move and deform along with the contact interface 127.

The thin film 140 is, advantageously, made of a flexible/pliable material, such as for example, a pliant plastic or a rubber material. The hydrophilic coating 141 is, advantageously, made of a hydrophilic material, e.g., nylon polyether sulfone, or their combination. The hydrophobic coating 142 is, advantageously, made of a hydrophobic material, e.g., polycarbonate, tetrafluoroethylene, polyparaxylene, polyethene, olefin, and/or polysiloxane.

The transmission member 144 has a first end 144a and a second end 144b, opposite to the first end 144a. The first end 144a is tightly connected to the hydrophobic coating 142, for example, via an adhesive. Preferably, the first end 144a is tightly connected to the center (i.e., the vertex or apex) of the hydrophobic coating 142. Alternatively, the transmission member 144 and the thin film 140 could be configured as a whole (e.g., co-molded). The second end 144b is exposed outside the chamber 120. The second end 144b is configured for engaging with one or more components to be driven to move along with the sliding of the transmission member 144. For example, the second end 144b could be engaged with a barrel of a lens module so that the barrel can move corresponding to the slide movement of the transmission member 144. Thus, optical elements assembled in the barrel can be moved along an optical axis thereof, thereby facilitating a focus adjustment thereof with respect to a photosensitive element.

Alternatively, the first end 144a could be tightly connected to the hydrophilic coating 141 and the second end 144b could extend out of the chamber 120 through the orifice 1202. Still alternatively, the second end 144b could extend out of the chamber 120 through another orifice defined in the substrate 120d so as to engage with, e.g., a corresponding particular lens module. It is to be understood that the transmission member 144 could be modified or varied in order to engage with various devices, e.g., currently available camera modules.

Figure 2:
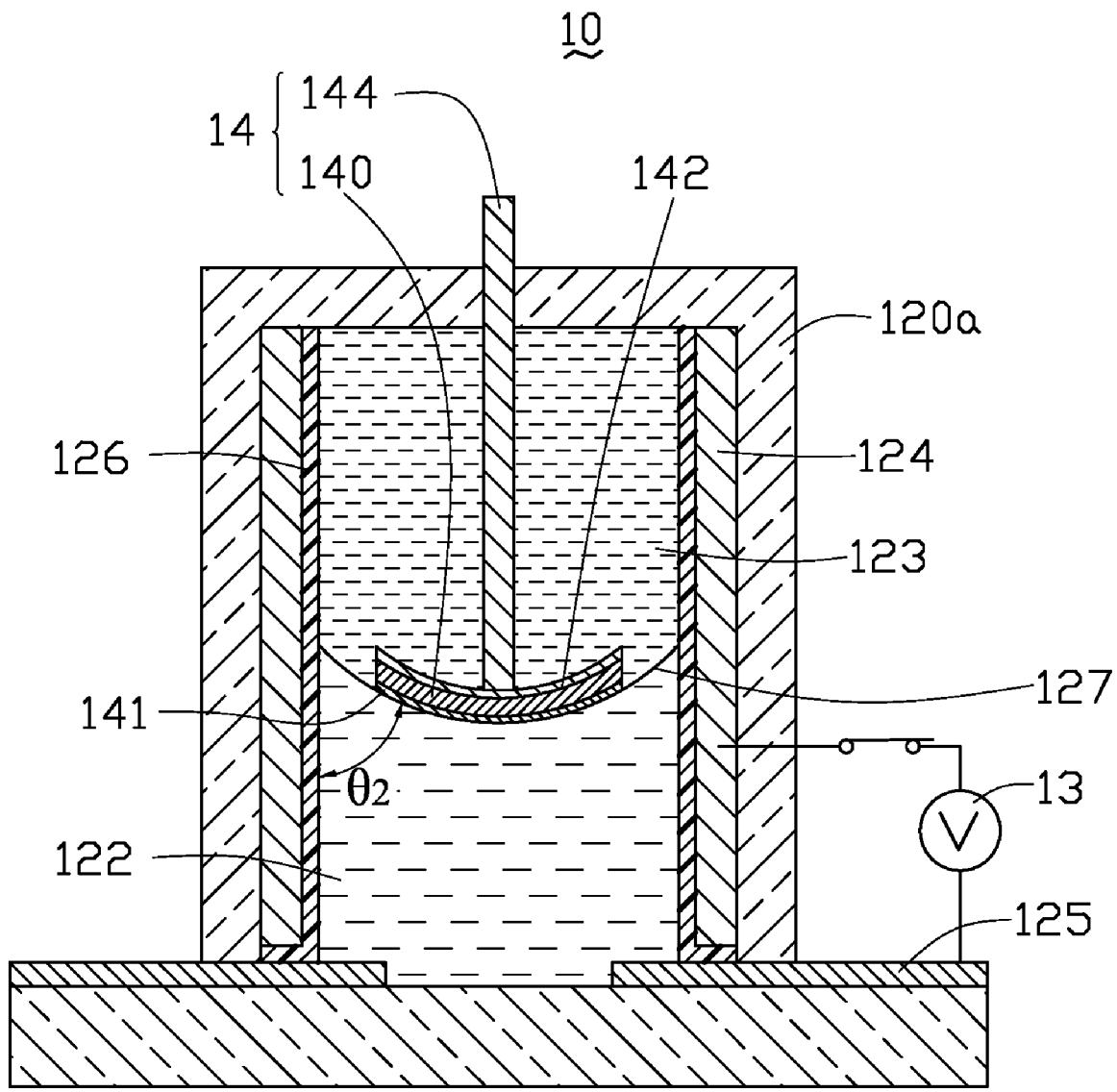
FIG. 2 is essentially similar to FIG. 1, but showing that the electrowetting effect happens in the miniature motor of FIG. 1.

FIG. 2 illustrates an electrowetting effect generated in the miniature motor 10 when a voltage (i.e., potential difference) is applied thereto. When a voltage source 13 is electrically connected to the first and second electrodes 124 and 125, an electric field is generated therebetween. Since the aqueous layer 122 is electrically connected to the second electrode 125 and is isolated from the first electrode 124 via the hydrophobic layer 126, a net voltage drop appears across the hydrophobic layer 126 and the aqueous layer 122. This net voltage drop electrostatically attracts the aqueous layer 122 towards the hydrophobic layer 126 and thus causes the aqueous layer 122 to wet the hydrophobic layer 126 at the peripheral edge of the aqueous layer 122. The aqueous layer 122 thereby forms a contact angle $\theta 2$ with respect to the hydrophobic layer 126. The contact angle $\theta 2$ is typically an acute angle (i.e., the contact interface 127 is concave relative to the aqueous layer 122, opposite to the situation in FIG. 1).

As the aqueous layer 122 wets the hydrophobic layer 126, i.e., the electrowetting effect appears, the oily layer 123 correspondingly protrudes inwardly towards the aqueous layer 122. Accordingly, the contact interface 127 is inwardly curved toward the aqueous layer 122. The thin film 140 is likewise inwardly curved toward the aqueous layer 122, due to the respective dissoluble ability of the hydrophilic coating 141 and the hydrophobic coating 142 in the aqueous layers 122 and the oily layer 123. As a result, the transmission member 144 connected to the thin film 140 correspondingly recedes and retracts inwardly into the chamber 120 along an axial direction of the transmission member 144.

When the voltage source 13 is shut off or disconnected from the first and second electrodes 124 and 125, the contact interface 127 restores its original status, as shown in FIG. 1. The transmission member 144 correspondingly moves outwardly towards the chamber 120. Therefore, the transmission member 144 moves inwardly and outwardly towards the chamber 120 when the voltage source 13 is correspondingly connected and disconnected to the first and second electrodes 124 and 125.

As such, the miniature motor 10 can generate an axial reciprocating movement, like a piston, when a pulse voltage source is applied thereto. Likewise, the miniature motor can controllably generate an axial movement when a controllable voltage source is applied thereto. Specifically, under a controllable voltage source, it would be possible to selectably adjust the displacement of the transmission member 144 to within a range of locations.

The axial displacement of the transmission member 144 is typically governed by an electrostatically modulated decrease in the contact angle from θ1 to θ2. This electrowetting behavior follows a combination of the Lippman and Young equations for electrowetting in a three-phase aqueous/oil/dielectric system:

$$\cos\theta_2 = \cos\theta_1 + \in_0 \in_r V^2/(2d\gamma_i)$$

Where $\in_0$ is dielectric constant in vacuum condition, $\in_r$ is relative dielectric coefficient of the dielectric material of the hydrophobic layer 126, V is voltage applied to the two electrodes 124 and 125, d is thickness of the hydrophobic layer 126, and $\gamma_i$ is the interfacial surface tension between the aqueous layer 122 and the oily layer 123.

Based on the equation, the axial displacement of the transmission member 144 substantially depends on the dielectric coefficient of the dielectric material of the hydrophobic layer, the applied voltage, and a thickness of the hydrophobic layer. Therefore, by adjusting or varying the voltage applied, the thickness, or dielectric material of the hydrophobic layer, the displacement of the transmission member can be adjusted or varied in a corresponding desired range.

Figure 3:
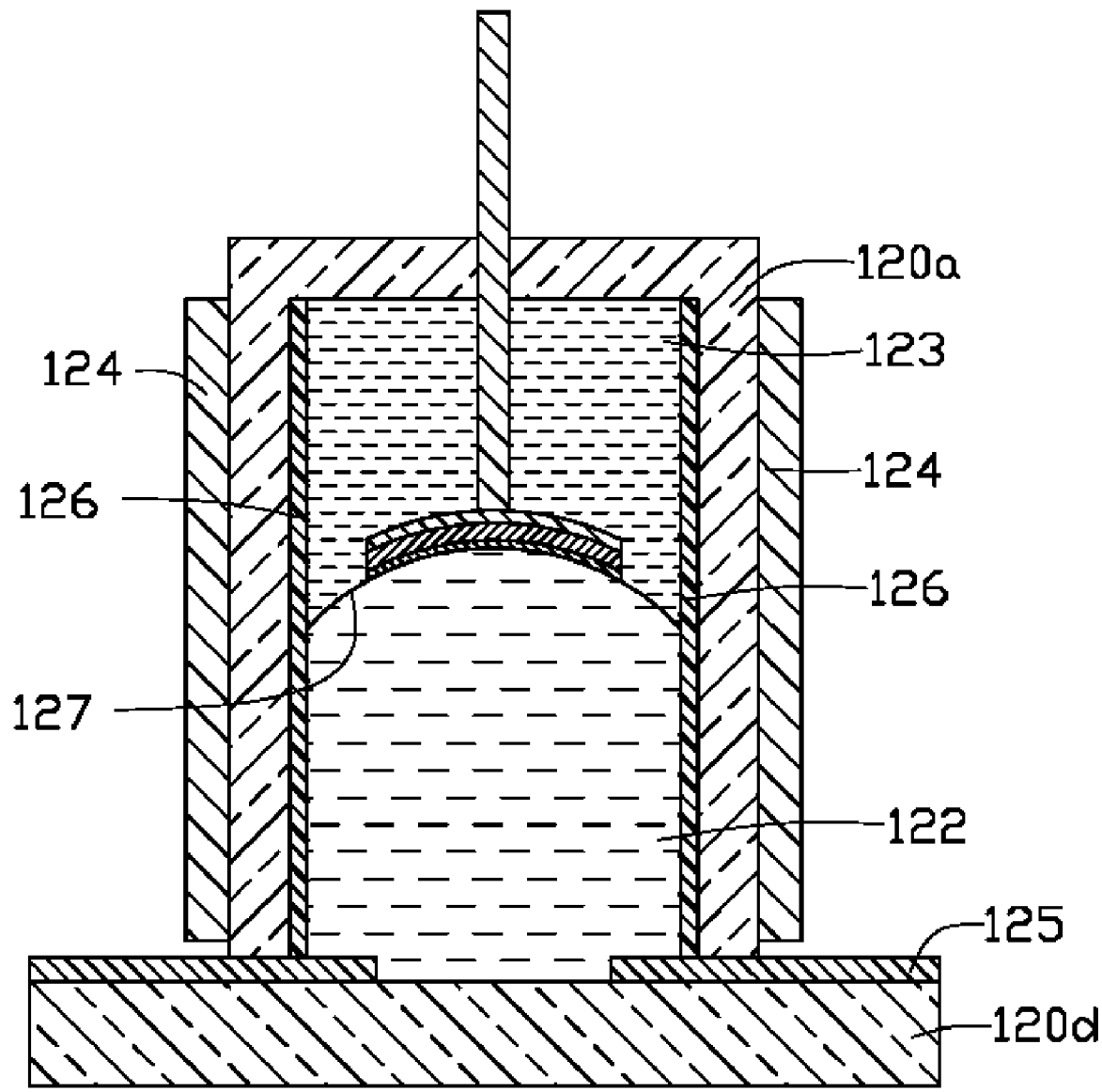
FIG. 3 is a schematic, cross-sectional view of another miniature motor, according to a second preferred embodiment.

FIG. 3 illustrates another miniature motor 20, in accordance with a second preferred embodiment. The miniature motor 20 is essentially similar to the miniature motor 10 except with respect to the position of the first electrode 124 and the hydrophobic layer 126. In this embodiment, the first electrode 124 is disposed on the sidewall 120a by surrounding an outer surface of the sidewall 120a. The hydrophobic layer 126 is annularly disposed on the inner surface of the sidewall 120a. Alternatively, the aqueous layer 122 and the oily layer 123 could contact the sidewall 120a without the hydrophobic layer 126. In this alternative embodiment, when a voltage is applied to the two electrodes 124 and 125, the electrowetting effect causes the aqueous layer 122 to more strongly wet the sidewall 120a. This change in wetting would also result in the movement of the transmission member 144.

Figure 4:
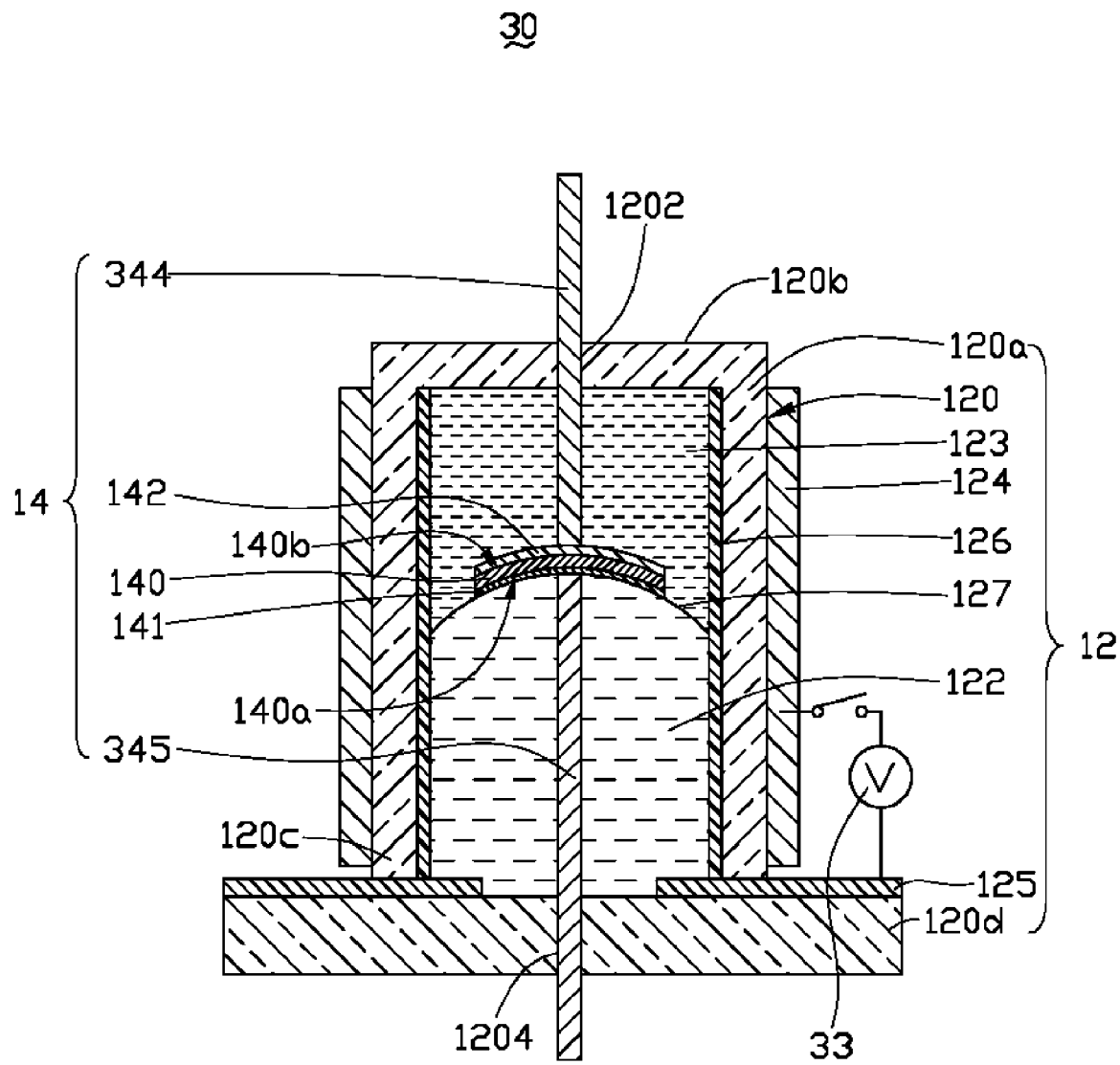
FIG. 4 is a schematic, cross-sectional view of another alternative miniature motor, according to a third preferred embodiment.

FIG. 4 illustrates another alternative miniature motor 30, in accordance with a third preferred embodiment. The miniature motor 30 is essentially similar to the miniature motor 10 except with respect to the transmission assembly 34. The transmission assembly 34 includes a thin film 140, a first transmission member 344, and a second transmission member 345. The first and second transmission members 344, 345 are tightly connected to the hydrophobic coating 142 and the hydrophilic coating 141, respectively. The substrate 120d further defines a through hole 1204. The first and second transmission members 344, 345 extend outside the chamber 120 through the orifice 1202 and the through hole 1204, respectively.

Similarly to the miniature motor 10, the first and second transmission members 344, 345 move inwardly and outwardly towards the chamber 120 when a pulse or otherwise controllable voltage source 33 applied to the first and second electrodes 124 and 125. As a result, the miniature motor 30 can generate an axial reciprocating movement in dual directions. It is to be understood that the transmission assembly could include three or more transmission members respectively connected to the hydrophobic coating 141 and/or the hydrophobic coating 142, in order to satisfy various actual applications.

The miniature motors 10, 20, 30 in shape are substantially a tubular container, without other thick and large attachments (i.e., exciting coils). As such, the size thereof is limited primarily by an appropriately operable container size. The miniature motors 10, 20, 30 contain a light oily layer and aqueous layer therein. Thus, the miniature motors 10, 20, 30 are compact and lightweight. Further, the miniature motors 10, 20, 30 generate little heat and have little mechanical abrasion associated with the internal operation thereof. So, the miniature motors 10, 20, 30 have a relatively long operating-lifetime expectancy.

The miniature motors 10, 20, 30 can be applied in various micro electro-mechanical systems (MEMS) or micro systems technology (MST), such as sensors and actuators, and in portable devices such as mobile phones and digital cameras. For example, in a digital camera, the present miniature motors could be applied as a driving mechanism to drive optical components to move along an optical axis direction. The movement of the optical components can also be adjusted or varied (i.e., controlled), for example, by an adjustable voltage source.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A miniature motor comprising:
   an actuator, the actuator comprising:
      a chamber;
      an electrically conductive aqueous layer accommodated in the chamber;
      a dielectric oily layer accommodated in the chamber, the oily layer contacting with the aqueous layer, thereby forming a contact interface therebetween; and
      a pair of electrodes configured for generating an electric field to induce the aqueous layer to produce an electrowetting effect; and
   a transmission assembly comprising:
      a thin film disposed at the contact interface, the thin film defining a first surface and a second surface opposite to the first surface, the first and second surfaces, respectively, facing towards the aqueous and oily layers, a hydrophilic coating and a hydrophobic coating being, respectively, formed on the first and second surfaces; and at least one transmission member, each transmission member having a first end and a second end opposite to the first end, the first end being connected to one of the hydrophilic coating and the hydrophobic coating of the thin film, the second end extending out of the chamber.

2. The miniature motor as claimed in claim 1, further comprising a dielectric hydrophobic layer surrounding a peripheral edge of the aqueous layer, the dielectric hydrophobic layer isolating the aqueous layer from one of the two electrodes.

3. The miniature motor as claimed in claim 2, wherein the chamber has a sidewall, one of the two electrodes being disposed on the sidewall of the chamber and being isolated from the aqueous layer by the hydrophobic layer, the other of the two electrodes being electrically connected to the aqueous layer.

4. The miniature motor as claimed in claim 3, wherein the sidewall of the chamber has an inner surface and an outer surface, the electrode disposed on the sidewall being disposed on one of the inner and outer surfaces.

5. The miniature motor as claimed in claim 2, wherein the hydrophobic layer is made of a dielectric and hydrophobic material selected from the group consisting of: polycarbonate, tetrafluoroethylene, polyparaxylene, polyethene, olefin, and polysiloxane.

6. The miniature motor as claimed in claim 1, wherein the chamber has an inner diameter of less than about 2 millimeters.

7. The miniature motor as claimed in claim 1, wherein the chamber is a hollow tubular container having a sidewall, a closed end wall, an opening end opposite to the end wall and a substrate hermetically disposed at the opening end, the closed end wall defining an orifice, the second end of the transmission member extending out of the chamber through the orifice.

8. The miniature motor as claimed in claim 7, wherein one of the two electrodes is annularly disposed on the sidewall, the other of the two electrodes being disposed on the substrate, the other electrode having a first portion electrically connected to the aqueous layer and a second portion extending out of the chamber.

9. The miniature motor as claimed in claim 8, wherein a voltage source is applied to the two electrodes.

10. The miniature motor as claimed in claim 1, wherein the at least one transmission member comprises two transmission members, one being connected to the hydrophilic coating and extending out of the chamber along a first direction, the other being connected to the hydrophobic coating and extending out of the chamber along a second direction opposite to the first direction.

11. The miniature motor as claimed in claim 10, wherein the chamber comprises a closed end wall, an opening end opposite to the end wall and a substrate hermetically disposed at the opening end, the closed end wall defining a first through orifice, the substrate defining a second through orifice, the two transmission members respectively extending out of the chamber through the first and second through orifices.

12. The miniature motor as claimed in claim 1, wherein each transmission member has a portion contacting the chamber, the portion being coated with a lubricant layer.

13. The miniature motor as claimed in claim 1, wherein the thin film is made of a flexible material.

14. The miniature motor as claimed in claim 1, wherein the hydrophobic coating is comprised of a hydrophobic material selected from the group consisting of: polycarbonate, tetrafluoroethylene, polyparaxylene, polyethene, olefin, and polysiloxane.

15. The miniature motor as claimed in claim 1, wherein the hydrophilic coating is comprised of a hydrophilic material selected from the group consisting of: nylon, polyether and a combination thereof.

16. A miniature motor comprising:
a chamber having a sidewall;
an electrically conductive aqueous layer accommodated in the chamber;
a dielectric oily layer accommodated in the chamber together with the aqueous layer to form a contact interface therebetween; and
a thin film disposed at the contact interface, the thin film having a hydrophilic surface and a hydrophobic surface opposite to the hydrophilic surface, the hydrophilic and hydrophobic surfaces, respectively, facing towards the aqueous and oily layers;
a first electrode disposed on the sidewall of the chamber, the first electrode being electrically isolated from the aqueous layer;
a second electrode electrically connected to the aqueous layer and, together with the first electrode, being configured for generating an electric field to transform the thin film along a direction of transformation due to an electrowetting effect of the aqueous layer; and
at least one transmission member connected with the thin film, each transmission member being capable of moving with the thin film along the direction of transformation of the thin film.

17. The miniature motor as claimed in claim 16, further comprising a dielectric hydrophobic layer surrounding a peripheral edge of the aqueous layer, the dielectric hydrophobic layer electrically isolating the aqueous layer from one of the first and second electrodes.

* * * * *